United States Patent
Kurahashi et al.

(10) Patent No.: US 9,341,155 B2
(45) Date of Patent: May 17, 2016

(54) IGNITION APPARATUS FOR INTERNAL COMBUSTION ENGINE

(71) Applicant: HONDA MOTOR CO., LTD., Tokyo (JP)

(72) Inventors: Makoto Kurahashi, Wako (JP); Noritaka Kimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/587,222

(22) Filed: Dec. 31, 2014

(65) Prior Publication Data

US 2015/0192100 A1 Jul. 9, 2015

(30) Foreign Application Priority Data

Jan. 8, 2014 (JP) ................. 2014-001443

(51) Int. Cl.
*F02P 15/10* (2006.01)
*F02P 15/08* (2006.01)
(Continued)

(52) U.S. Cl.
CPC .............. *F02P 15/08* (2013.01); *F02P 5/1502* (2013.01); *F02P 11/00* (2013.01); *F02P 15/10* (2013.01); *F02D 41/182* (2013.01); *F02D 2200/101* (2013.01); *Y02T 10/46* (2013.01)

(58) Field of Classification Search
CPC ............. F02P 15/10; F02P 15/08; F02P 3/04; F02P 3/0407; F02P 9/002; F02P 9/007
USPC ................................. 123/621, 622
See application file for complete search history.

(56) References Cited

U.S. PATENT DOCUMENTS 3,892,219 A * 7/1975 Preiser ............... F02P 3/051
123/629

3,945,362 A * 3/1976 Neuman ............... F02P 3/0453
123/606

(Continued)

FOREIGN PATENT DOCUMENTS

DE 10 2012 106 207 B3 5/2013
DE 10 2013 102 529 A1 9/2014
(Continued)

OTHER PUBLICATIONS

German Office Action application No. 10 2015 200 019.2 issued Feb. 6, 2015.
(Continued)

*Primary Examiner* — Thomas Moulis
(74) *Attorney, Agent, or Firm* — Squire Patton Boggs (US) LLP (57) ABSTRACT

An ignition apparatus for an internal combustion engine, comprising at least one ignition plug, an actuating circuit provided with first and second coil pairs corresponding to one ignition plug for generating spark discharge in the at least one ignition plug. First and second ignition signals respectively supplied to the first and second coil pair are generated so that a first discharge period and a second discharge period partially overlap with each other during an overlap discharge period, the overlap discharge period is made equal to a set overlap period, and a start timing of the first discharge period is prior to a start timing of the second discharge period. The first and second discharge periods are time periods of electric discharges generated by the first and second coil pairs. The set overlap period is set according to the first discharge period, a temporary cut threshold value, and a discharge start current value at the start timing of the first discharge period. The temporary cut threshold value is a minimum value of the discharge current value at which no temporary cut of the discharge current in the ignition plug occurs.

8 Claims, 6 Drawing Sheets

(51) Int. Cl.
*F02P 5/15* (2006.01)
*F02P 11/00* (2006.01)
*F02D 41/18* (2006.01)

(56) References Cited

U.S. PATENT DOCUMENTS

| | | | | |
|---|---|---|---|---|
| 4,922,874 | A | * | 5/1990 | DeBiasi ............... F02P 5/15 123/406.65 |
| 5,014,676 | A | * | 5/1991 | Boyer ................ F02P 3/0453 123/637 |
| 5,044,348 | A | * | 9/1991 | Ookawa ............. F02P 3/0838 123/637 |
| 5,097,815 | A | * | 3/1992 | Oota .................. F02P 15/008 123/606 |
| 5,193,515 | A | * | 3/1993 | Oota .................. F02P 15/10 123/604 |
| 5,197,449 | A | * | 3/1993 | Okamoto ............. F02P 3/0435 123/622 |
| 6,705,302 | B2 | * | 3/2004 | Melnders ............ F02P 3/0453 123/620 |
| 8,286,617 | B2 | * | 10/2012 | Grady ................. F02P 3/04 123/605 |
| 8,813,732 | B2 | * | 8/2014 | Kataoka .............. F02P 3/051 123/621 |
| 2009/0260607 | A1 | * | 10/2009 | LaDuke .............. F02P 9/002 123/609 |

FOREIGN PATENT DOCUMENTS

| | | | |
|---|---|---|---|
| EP | 2 325 476 | A1 | 5/2011 |
| EP | 2 410 169 | A1 | 1/2012 |
| JP | S64083863 | A * | 3/1989 ............. F02P 3/04 |
| JP | 7229461 | A * | 8/1995 |
| JP | 5047247 | B2 | 10/2012 |

OTHER PUBLICATIONS

German Search Report application No. 10 2015 200 019.2 issued Feb. 6, 2015.

* cited by examiner

IGNITION APPARATUS FOR INTERNAL COMBUSTION ENGINE

BACKGROUND OF THE INVENTION

1. Field of the Invention

The present invention relates to an ignition apparatus for an internal combustion engine, and particularly to an ignition apparatus in which an actuating circuit for actuating one ignition plug is provided with two coil pairs, and multiple ignition is performed by generating a high secondary voltage at comparatively short time intervals.

2. Description of the Related Art

Japanese patent publication No. 5047247 (JP'247) discloses an ignition apparatus in which an actuating circuit for actuating one ignition plug is provided with two coil pairs, and ignition is performed by changing the used coil pair(s) according to electric discharge energy demand for the ignition plug. In this apparatus, ignition using one coil pair is performed when the electric discharge energy demand is comparatively low, and multiple ignition using two coil pairs in one cycle is performed in the boost-power ignition region where the electric discharge energy demand is comparatively high. Further, JP'247 also shows a control in which ignition is performed by alternately using one of the two coil pairs for every predetermined number of cycles.

According to the apparatus shown in JP'247, simultaneous discharge or alternate discharge using the two coil pairs is performed in the boost-power ignition region, as shown in FIG. 3 of JP'247. However in the simultaneous discharge, the discharge current of the ignition plug becomes comparatively large, which causes a problem that wear of the ignition plug by sputtering (collision of positive ions to the plug electrode) is readily occurred.

Further, in the alternate discharge, a temporary cut of the discharge current (a short period interruption of the discharge current) occurs, and the discharge is restarted immediately after the temporary cut. However, the discharge current becomes maximum at the time of starting the discharge (upon occurrence of the insulation breakdown). Accordingly, if frequency of starting the discharge becomes high, there is a problem that wear of the ignition plug is promoted by plug melting due to frequent start of the discharge. Therefore, in the above-described conventional apparatus, there is a room for improvement in the discharge control for suppressing wear of the ignition plug.

SUMMARY OF THE INVENTION

The present invention was made contemplating the above-described points, and an objective of the present invention is to provide an ignition apparatus which is able to appropriately generate ignition signals supplied to two coil pairs and to suppress wear of the ignition plug.

To attain the above objective, the present invention provides an ignition apparatus for an internal combustion engine comprising at least one ignition plug (1), an actuating circuit (2) provided with first and second coil pairs (11, 12) corresponding to one ignition plug for generating spark discharge in the at least one ignition plug (1), and control means for generating first and second ignition signals (S11, S12) supplied respectively to the first and second coil pairs (11, 12). The control means generates the first and second ignition signals (S11, S12) so that a first discharge period (TSP1) and a second discharge period (TSP2) partially overlap with each other during an overlap discharge period (TVOL), the overlap discharge period (TVOL) is made equal to a set overlap period (TOVLSET), and a start timing (t2) of the first discharge period (TSP1) is prior to a start timing (t3) of the second discharge period (TSP2). The first discharge period (TSP1) is a time period from start to end of an electric discharge generated by electric current supplied to a first primary coil (11a) constituting the first coil pair (11), and the second discharge period (TSP2) is a time period from start to end of an electric discharge generated by electric current supplied to a second primary coil (12a) constituting the second coil pair (12). The set overlap period (TOVLSET) is set according to the first discharge period (TSP1), a temporary cut threshold value (ISPTH), and a discharge start current value (ISPPKL) which is a discharge current value at the start timing (t2) of the first discharge period (TSP1). The temporary cut threshold value (ISPTH) is a minimum value of the discharge current value at which no temporary cut of the discharge current in the ignition plug (1) occurs.

With this configuration, the first and second ignition signals are generated so as to satisfy the following conditions:

1) the first discharge period from start to end of the electric discharge generated by electric current supplied to the first primary coil, and the second discharge period from start to end of the electric discharge generated by electric current supplied to the second primary coil, partially overlap with each other during the overlap discharge period;

2) the start timing of the first discharge period is prior to the start timing of the second discharge period; and 3) the overlap discharge period is made equal to the set overlap period which is set according to the first discharge period, the temporary cut threshold value, and the discharge start current value which is a discharge current value at the start timing of the first discharge period.

By generating the first and second ignition signals as described above and appropriately setting the set overlap period, it is possible to perform the multiple ignition in which the maximum value of the discharge current is reduced as greatly as possible within the range where no temporary cut of the discharge current occurs, thereby suppressing wear of the ignition plug.

Preferably, the control means starts to supply current to the second primary coil (12a) when an offset time period (TOSF) has elapsed from the time (t0) of starting to supply current to the first primary coil (11a), and the current supply period (TON1) of the first primary coil (11a) is set to be equal to the current supply period (TON2) of the second primary coil (12a). Further, the offset time period (TOSF) is set to the time period obtained by subtracting the set overlap period (TOVLSET) from the first discharge period (TSP1).

With this configuration, the current supply period of the first primary coil is set to be equal to the current supply period of the second primary coil, supplying current to the second primary coil is started when the offset time period has elapsed from the time of starting to supply current to the first primary coil (11a), and the offset time period is set to the time period obtained by subtracting the set overlap period from the first discharge period. By performing the supply current control of the first and second primary coils as described above, the overlap discharge period can be made to coincide with the set overlap period.

Preferably, the set overlap period is set to a time period which is in the vicinity of a target period (TTGT) calculated with the following equation (A), and is equal to or longer than the target period (TTGT).

$$TTGT = TSP1 \times ISPTH / ISPPKL \qquad (A)$$

where TTGT is the target period, TSP1 is the first discharge period, ISPTH is the temporary cut threshold value, and ISP-PKL is the discharge start current value.

With this configuration, the set overlap period is set to the time period which is in the vicinity of the target period calculated with the equation (A), and is equal to or longer than the target period. Accordingly, it is possible to reduce the maximum value of the discharge current to a minimum value within the range where no temporary cut of the discharge current occurs, and to set the set overlap period to an optimum value for suppressing wear of the ignition plug due to sputtering.

Preferably, the control means includes temporary cut threshold value calculating means for calculating the temporary cut threshold value (ISPTH) according to at least one engine operating parameter (NE, GA) correlated with gas flow generated in a combustion chamber of the engine, and the control means sets the set overlap period (TOVLSET) using the temporary cut threshold value (ISPTH) calculated by the temporary cut threshold value calculating means.

With this configuration, the temporary cut threshold value is calculated according to at least one engine operating parameter correlated with gas flow generated in the combustion chamber of the engine, and the set overlap period is set using the calculated temporary cut threshold value. The temporary cut threshold value changes depending on the state of gas flow generated in the combustion chamber. Accordingly, by calculating the temporary cut threshold value according to the engine operating parameter(s) correlated with the gas flow and setting the set overlap period using the calculated temporary cut threshold value, the set overlap period can appropriately be set corresponding to the engine operating condition.

For example, in the low engine rotational speed operating condition or in the low load operating condition of the engine, the temporary cut threshold value becomes a comparatively small value. Accordingly, by making the set overlap period shorter according to the temporary cut threshold value, the maximum value of the discharge current can be reduced.

DETAILED DESCRIPTION OF THE PREFERRED EMBODIMENTS

Preferred embodiments of the present invention will now be described with reference to the drawings.

Figure 1:
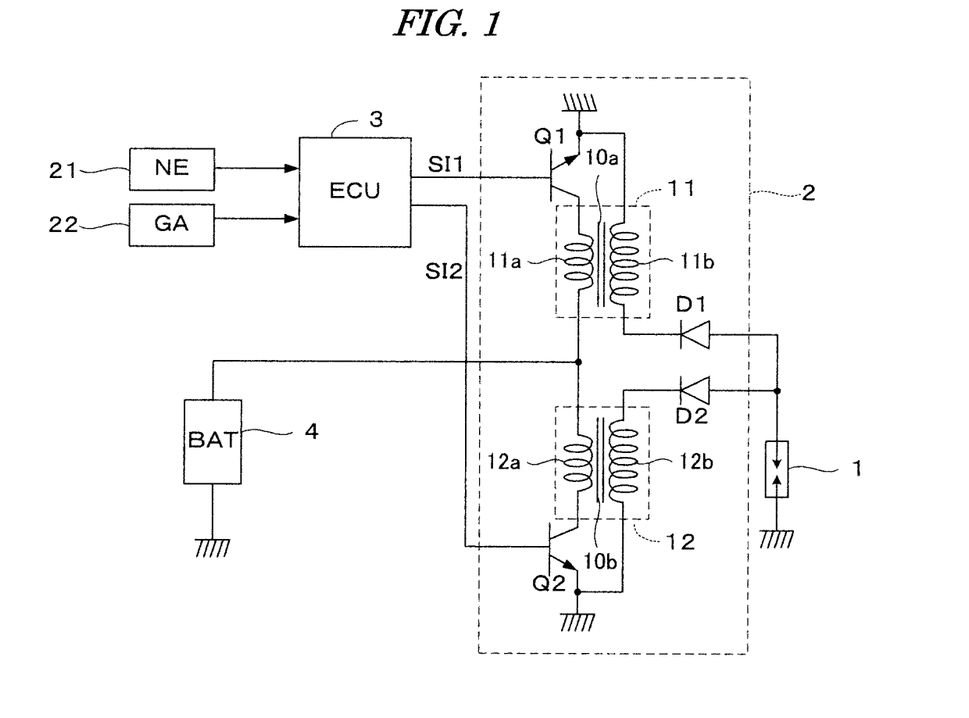
FIG. 1 shows a configuration of a main part of an ignition apparatus for an internal combustion engine according to one embodiment of the present invention.
Figure 2:
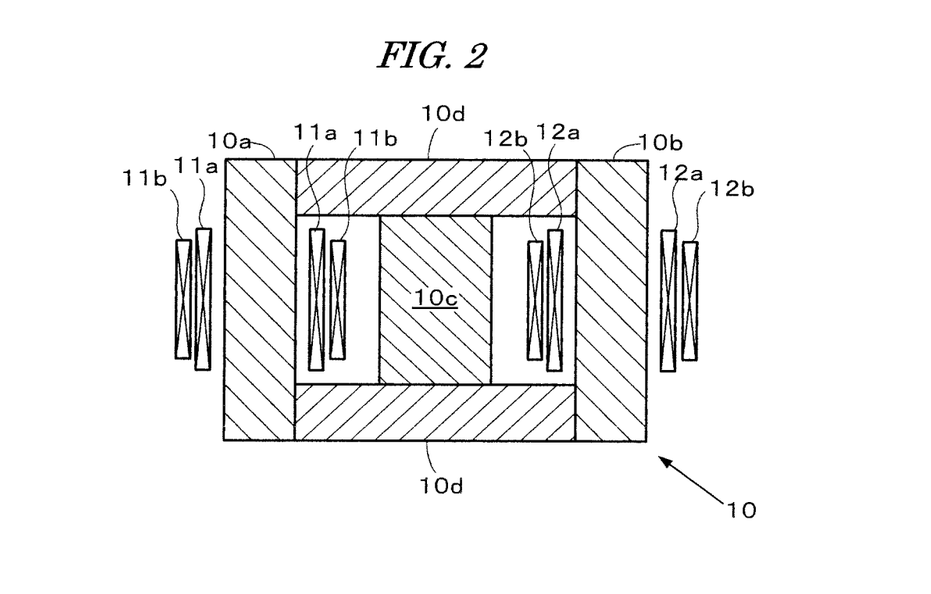
FIG. 2 is a vertical section showing two coil pairs included in the ignition apparatus, and a core around which the coil pairs are wound.

FIG. 1 shows a configuration of a main part of an ignition apparatus for an internal combustion engine according to one embodiment of the present invention, and FIG. 2 is a vertical section showing two coil pairs included in the ignition apparatus, and a core around which the coil pairs are wound.

The internal combustion engine (not shown) has, for example, four cylinders, and each cylinder is provided with an ignition plug 1. An actuating circuit 2 for generating a spark discharge in the ignition plug 1 is provided with two coil pairs 11 and 12. The first coil pair 11 is configured by winding a primary coil 11a and a secondary coil 11b around a core 10, and the second coil pair 12 is configured by winding a primary coil 12a and a secondary coil 12b around the core 10.

The core 10 is configured by assembling the components of laminated thin iron plates without any gap. As shown in FIG. 2, the core 10 comprises a first main core 10a around which the first coil pair 11 is wound, a second main core 10b around which the second coil pair 12 is wound, and peripheral cores 10c and 10d which constitute a magnetic circuit with the main cores 10a and 10b. Both of the magnetic flux generated by supplying current to the first primary coil 11a of the first coil pair 11 and the magnetic flux generated by supplying current to the second primary coil 12a of the second coil pair 12 pass through the peripheral core 10c. Accordingly, the peripheral core 10c is configured so that the cross-section area thereof is larger than the cross-section area of the main cores 10a and 10b.

One ends of the primary coils 11a and 12a are connected to the positive electrode of a battery 4, and other ends are connected to the collector terminals of transistors Q1 and Q2 as switching elements. The emitter terminals of the transistors Q1 and Q2 are connected to the ground, and the base terminals thereof are connected to the electronic control unit (hereinafter referred to as "ECU") 3. The ignition signals SI1 and SI2 are supplied to the base terminals of the transistors Q1 and Q2 from the ECU 3, and the on/off state of the transistors Q1 and Q2 is controlled by the ECU 3.

One electrode of the ignition plug 1 is connected to the ground, and the other electrode of the ignition plug 1 is connected to one ends of the secondary coils 11b and 12b through diodes D1 and D2. The other ends of the secondary coils 11b and 12b are connected to the ground.

A rotational speed sensor 21 for detecting an engine rotational speed NE, an intake air flow rate sensor 22 for detecting an intake air flow rate GA of the engine 1, and other sensors not illustrated are connected to the ECU 3. The detection signals from the sensors are supplied to the ECU 3. The ECU 3 performs, based on the detection signals from the sensors, the control of a fuel injection amount by the fuel injection valve (not shown), and the ignition control (generation of the ignition signals SI1 and SI2) described below.

When the transistors Q1 and Q2 are turned on with the ignition signals SI1 and SI2, the primary current is supplied to the primary coils 11a and 12a. When the transistors Q1 and Q2 are turned off, a high voltage is generated between both ends of the secondary coils 11*b* and 12*b*, and spark discharge is generated between the electrodes of the ignition plug 1. The discharge current ISP takes a maximum value at the beginning of the discharge, and gradually decreases as time elapses.

In this embodiment, the ignition control is performed so that the control mode is switched between an overlap ignition mode and an alternate ignition mode according to the engine rotational speed, wherein the secondary voltage Vb between both ends of the secondary coils 11*b* and 12*b* of the first and second coil pairs 11 and 12 is generated at comparatively short time intervals in the overlap ignition mode, and in the alternate ignition mode, ignition by the first coil pair 11 and ignition by the second coil pair 12 are alternately performed for every one combustion cycle.

Figure 3A:
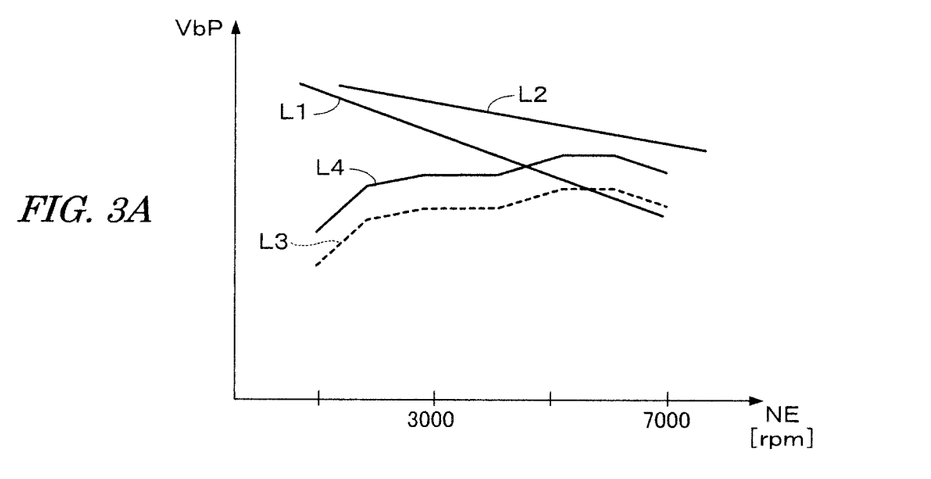
FIGS. 3A and 3B show graphs for illustrating relationships between the engine rotational speed (NE) and a peak value (VbP) of a voltage between both ends of a secondary coil (11b, 12b)
Figure 3B:
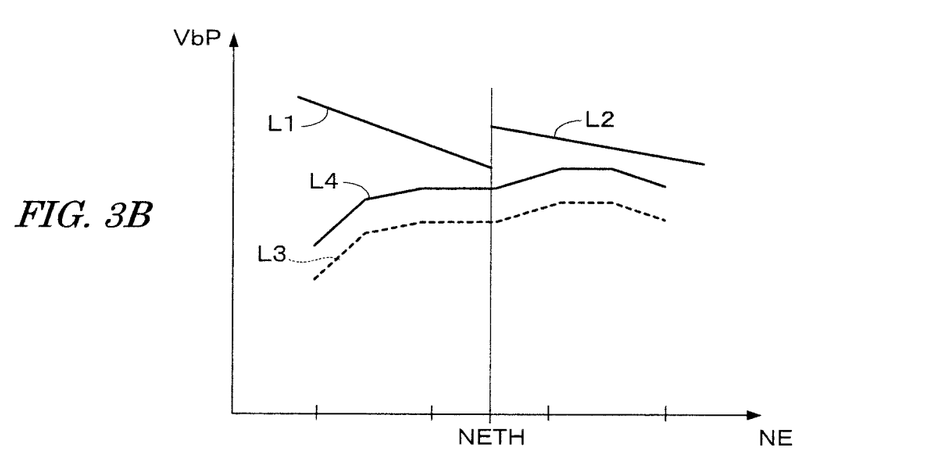

FIGS. 3A and 3B show graphs for illustrating relationships between the engine rotational speed NE and a peak value VbP of the voltage between both ends of the secondary coils 11*b* and 12*b* (VbP is hereinafter referred to as "peak secondary voltage"). The solid line L1 corresponds to the overlap ignition mode, and the solid line L2 corresponds to the alternate ignition mode. As clear from FIG. 3A, the peak secondary voltage VbP in the overlap ignition mode (L1) is lower than that in the alternate ignition mode (L2). Further, the dashed line L3 shown in FIG. 3A corresponds to a demand ignition voltage VIGINI in the state where the ignition plug 1 is not deteriorated (VIGINI is hereinafter referred to as "initial demand ignition voltage", and the solid line L4 corresponds to a demand ignition voltage VIGDET in the state where the ignition plug 1 is deteriorated by wear or the like (VIGDET is hereinafter referred to as "deteriorated demand ignition voltage"). The demand ignition voltage is the minimum voltage that is able to generate electric discharge in the ignition plug 1. It is to be noted that the peak secondary voltage VbP is reduced as the engine rotational speed NE increases, in order to suppress temperature rise of the coil pair.

As shown in FIGS. 3A and 3B, the deteriorated demand ignition voltage VIGDET (L4) becomes higher than the initial demand ignition voltage VIGINI (L3). Further, in the overlap ignition mode, the peak secondary voltage VbP (L1) becomes lower than the deteriorated demand ignition voltage VIGDET (L4), which makes it impossible to perform the ignition when the engine rotational speed NE becomes high. On the other hand, in the alternate ignition mode, the peak secondary voltage VbP (L2) is higher than the deteriorated demand ignition voltage VIGDET (L4) even in the high rotational speed condition, which makes it possible to surely perform the ignition.

Accordingly, in this embodiment, the ignition control is performed as shown in FIG. 3B so that the ignition is performed by the overlap ignition mode when the engine rotational speed NE is equal to or lower than a rotational speed threshold value NETH (for example, 4000 rpm), and the ignition is performed by the alternate ignition mode when the engine rotational speed NE is higher than the rotational speed threshold value NETH.

Figure 4A:
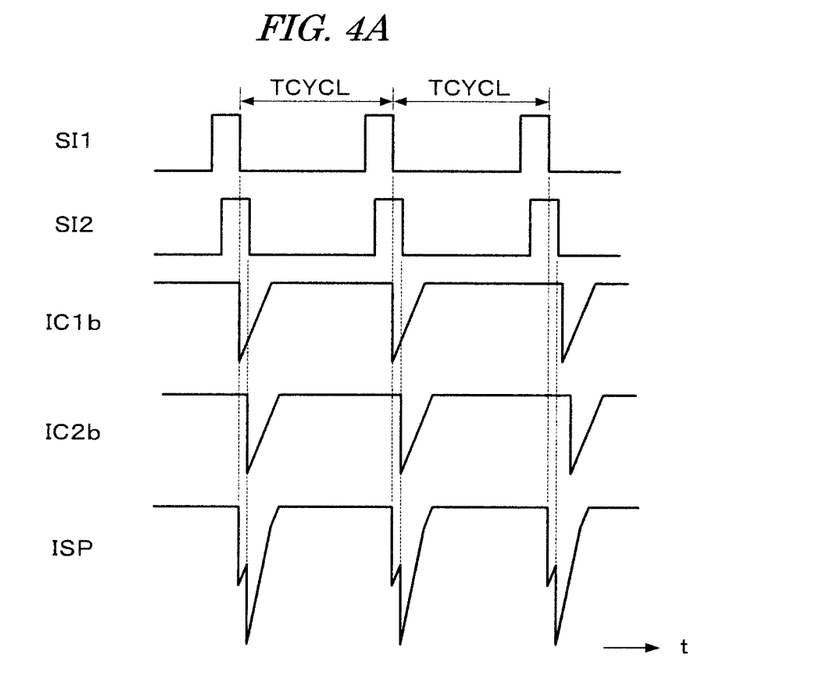
FIGS. 4A and 4B are time charts showing changes in ignition signals (SI1, SI2), secondary coil currents (IC1b, IC2b), and a discharge current (ISP) in an overlap ignition mode and an alternate ignition mode.
Figure 4B:
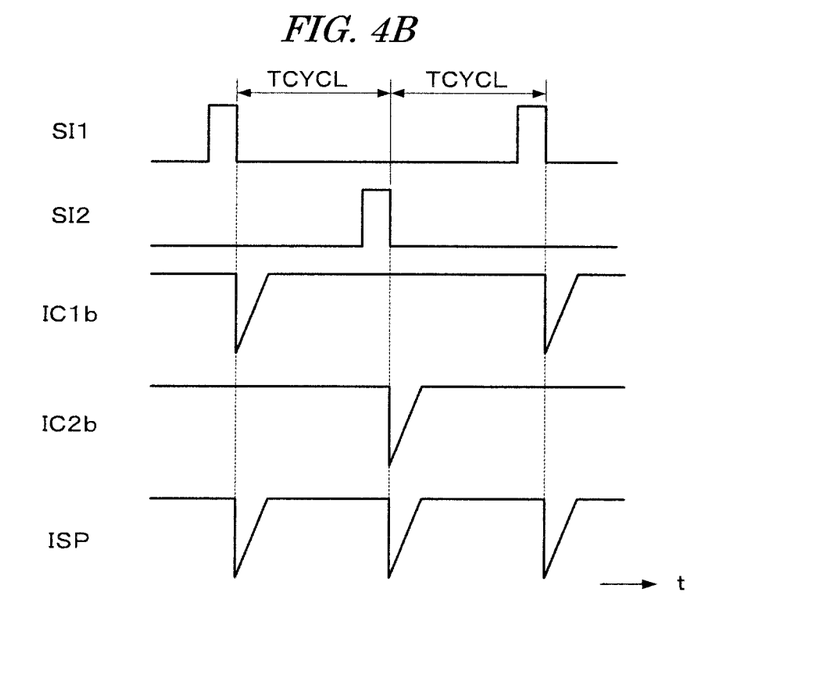

FIGS. 4A and 4B are time charts showing changes in the ignition signals SI1 and SI2, the secondary coil currents IC1*b* and IC2*b*, and the discharge current ISP in the overlap ignition mode and the alternate ignition mode. FIG. 4A corresponds to the overlap ignition mode, and FIG. 4B corresponds to the alternate ignition mode. In this specification, the description is based on the absolute values with respect to the magnitude relationship of the discharge current value or changes (increase or decrease) in the discharge current value, although the secondary coil currents IC1*b* and IC2*b*, and the discharge current ISP are indicated as negative values (as these parameters increases downward from the state of "0") in FIGS. 4A and 4B.

In the overlap ignition mode, the ignition signals SI1 and SI2 are respectively output with some time difference for every one combustion cycle TCYCL. The electric discharge is started from the off time of the ignition signal, and the secondary coil current IC1*b* and IC2*b* are supplied. The discharge current ISP between electrodes of the ignition plug 1 is equal to a sum of the secondary coil currents IC1*b* and IC2*b*. Accordingly, the peak value of the discharge current ISP becomes larger than that of the discharge current ISP in the ignition performed by only one coil pair.

In the alternate ignition mode, one of the ignition signals SI1 and SI2 is output for every one combustion cycle TCYCL, and the secondary coil currents IC1*b* and IC2*b* are alternately supplied for every one combustion cycle TCYCL. Accordingly, the peak value of the discharge current ISP is equal to that of the discharge current ISP in the ignition performed by only one coil pair.

Figure 5:
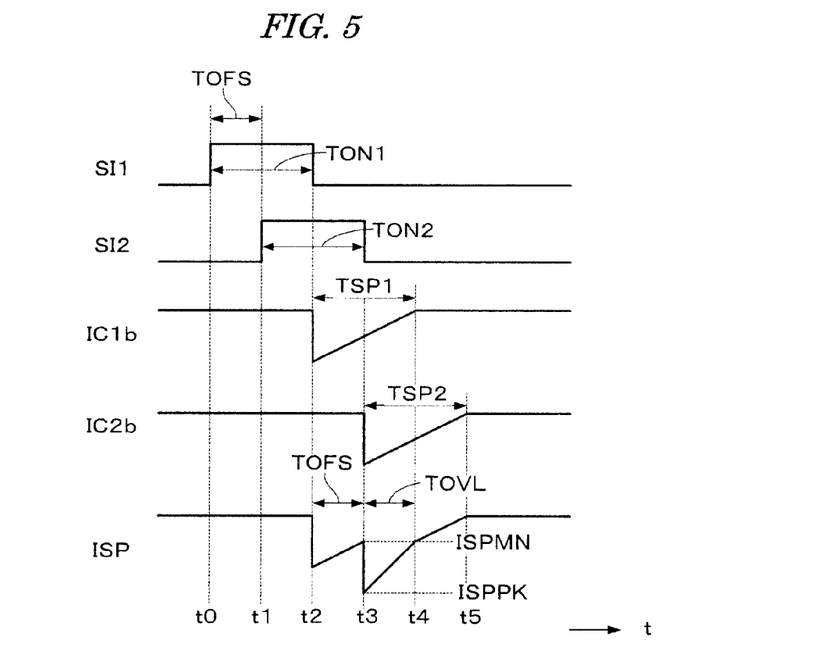
FIG. 5 shows time charts showing changes in the ignition signals (SI1, SI2) and the discharge current (ISP) in the overlap ignition mode.

FIG. 5 shows time charts illustrating changes in the ignition signals SI1 and SI2, and the discharge current ISP in the overlap ignition mode. The method of generating the ignition signals SI1 and SI2 in the overlap ignition mode is described below with reference to FIG. 5. In the below-described description, the component names and the parameters relevant to the first coil pair is indicated with "first" and the component names and the parameters relevant to the second coil pair is indicated with "second".

The ignition signals SI1 and SI2 are generated so that current supply to the first primary coil 11*a* is performed during the period from time t0 to t2, and current supply to the second primary coil 12*a* is performed during the period from time t1 to t3. In other words, the ignition signals SI1 and SI2 are generated so that the current supply periods of the first and second primary coils 11*a* and 12*a* partially overlap with each other, and the current supply to the second primary coil 12*a* ends at time t3 which is after time t2 at which the current supply to the first primary coil 11*a* ends.

Figure 6:
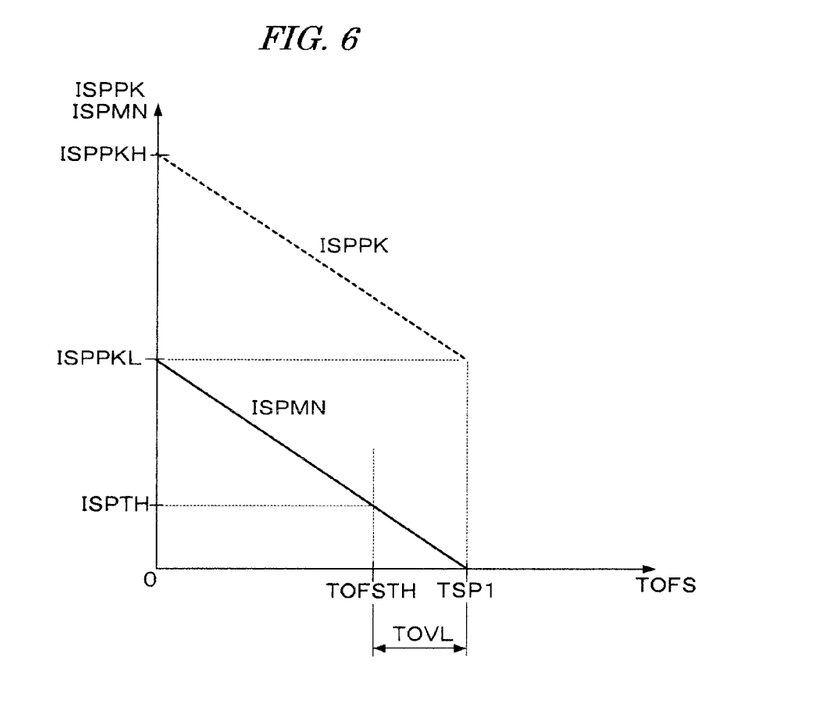
FIG. 6 shows a relationship between an offset time period (TOFS) indicative of a difference between the current supply start timings of two primary coils, and a peak discharge current (ISPPK) and a minimum discharge current (ISPMN)

The discharge current ISP in this case takes a peak value corresponding to the current supply end of the first primary coil 11*a* at time t2, and thereafter decreases gradually. At time t3, the discharge current ISP takes another peak value corresponding to the current supply end of the second primary coil 12*a*. In this description, the greatest peak value shown in FIG. 5 is defined as the peak discharge current ISPPK; the discharge current immediately before the second secondary coil current IC2*b* begins to flow at time t3 is defined as the minimum discharge current ISPMN; and the period from time t0 to time t1 is defined as the offset time period TOFS. FIG. 6 shows a relationship between the offset time period TOFS and the peak discharge current ISPPK and a relationship between the offset time period TOFS and the minimum discharge current ISPMN. In FIG. 6, the dashed line corresponds to the peak discharge current ISPPK, and the solid line corresponds to the minimum discharge current ISPMN.

In this embodiment, the current supply period TON1 of the first primary coil 11*a* is equal to the current supply period TON2 of the second primary coil 12*a*. Further, the period during which the first secondary current IC1*b* flows through the first secondary coil 11*b*, i.e., the period from start (t2) to end (t4) of the electric discharge generated by the current supply to the first primary coil 11*a*, is defined as a first discharge period TSP1. Similarly, the period during which the second secondary current IC2*b* flows through the second secondary coil 12*b*, i.e., the period from start (t3) to end (t5)

of the electric discharge generated by the current supply to the second primary coil 12a, is defined as a second discharge period TSP2.

When the offset time period TOFS is "0", i.e., when the current supply periods of the first and second primary coils 11a and 12a completely overlap with each other, the periods during which the secondary coil currents IC1b and IC2b flow also overlap with each other. Accordingly, the peak indicating the local minimum value (ISPMN) at time t3 disappears. In this case, the minimum discharge current ISPMN can be regarded as equal to a peak value ISPPKL of the secondary coil current IC1b corresponding to the first coil pair 11 (ISPPKL is hereinafter referred to as "minimum peak value"). The peak discharge current ISPPK is equal to a maximum peak value ISPPKH corresponding to a value approximately twice of the minimum peak value ISPPKL. The minimum peak value ISPPKL corresponds to a discharge current value at the start timing of the electric discharge caused by the secondary voltage generated in the first coil pair 11.

The minimum discharge current ISPMN and the peak discharge current ISPPK decrease as the offset time period TOFS increases. If the offset time period TOFS is equal to the first discharge period TSP1, the minimum discharge current ISPMN is equal to "0" and the peak discharge current ISPPK is equal to the minimum peak value ISPPKL.

If the minimum discharge current ISPMN becomes small, a short period interruption of the discharge current (hereinafter referred to as "temporary cut of the discharge current") occurs. If the temporary cut of the discharge current occurs, the discharge will be thereafter restarted at the end of the current supply to the second primary coil 12a. Accordingly, frequency of starting the discharge becomes high, and wear of the ignition plug 1 is promoted. It is therefore necessary to generate the ignition signals SI1 and SI2 so that the minimum discharge current ISPMN takes an appropriate value.

ISPTH shown in FIG. 6 indicates the minimum value (for example, about 30 mA) of the discharge current at which the temporary cut of the discharge current does not occur at all, and ISPTH is hereinafter referred to as "temporary cut threshold value". If the minimum discharge current ISPMN is equal to or greater than the temporary cut threshold value ISPTH, the temporary cut of the discharge current can surely be prevented. Accordingly, the greatest value of the offset time period TOFS which can surely prevent the temporary cut of the discharge current is equal to TOFSTH shown in FIG. 6. TOFSTH is therefore hereinafter referred to as "temporary cut preventing offset time period."

The temporary cut threshold value ISPTH tends to change depending on the operating condition of the internal combustion engine. Specifically, the temporary cut threshold value ISPTH tends to increase as the engine rotational speed increases, and to increase as load on the engine increases. Accordingly, in this embodiment, the temporary cut threshold value ISPTH is previously set to a value at which the temporary cut of the discharge current does not occur even in the high rotational speed and high load condition which corresponds to the severest condition.

The peak discharge current ISPPK increases as the offset time period TOFS decreases, which enhances the possibility that wear due to sputtering occurs in the ignition plug 1. Accordingly, by setting the offset time period TOFS to the temporary cut preventing offset time period TOFSTH, the peak discharge current ISPPK can be made minimum in the range where the temporary cut of the discharge current does not occur. In other words, this is the best setting of the offset time period TOFS for suppressing wear of the ignition plug 1.

Setting the offset time period TOFS to the temporary cut preventing offset time period TOFSTH corresponds to setting an overlap discharge period TOVL to a target period TTGT calculated by the following equation (1). The overlap discharge period TOVL is, as shown in FIG. 5, an overlap period of the first discharge period TSP1 and the second discharge period TSP2 caused by the secondary voltages generated by the coil pairs 11 and 12. The equation (1) is obtained based on the empirical fact that the relationship between the offset time period TOFS and the minimum discharge current ISPMN is substantially linear as shown in FIG. 6.

$$TTGT = TSP1 \times ISPTH/ISPPKL \quad (1)$$

It is desirable to set the overlap discharge period TOVL so as to coincide with the target period TTGT. However, it is difficult to make the overlap discharge period TOVL completely coincide with the target period TTGT. Accordingly, the ignition signals SI1 and SI2 is generated so that the overlap discharge period TOVL coincides with a set overlap period TOVLSET which is in the vicinity of the target period TTGT and equal to or greater than the target period TTGT. In order to make the overlap discharge period TOVL coincide with the set overlap period TOVLSET, the offset time period TOFS is set by the following equation (2). The equation (2) is obtained as follows. In this embodiment, the first current supply period TON1 is equal to the second current period TON2, and consequently the offset time period TOFS from time t0 to time t1 is equal to the period from time t2 to time t3.

$$TOFS = TSP1 - TOVLSET \quad (2)$$

Figure 7A:
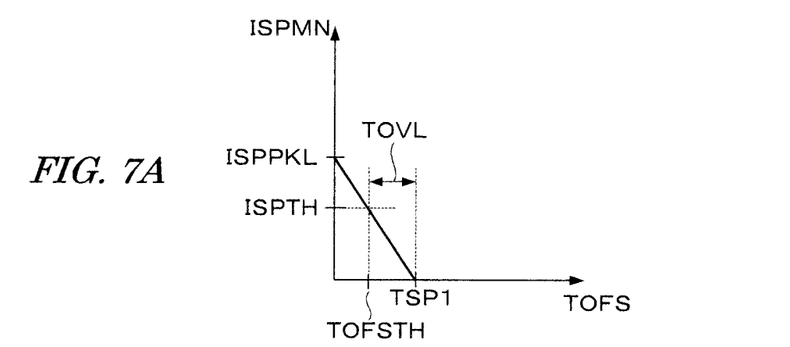
FIGS. 7A and 7B are drawings for explaining that the offset time period (TOFSTH) which can prevent a temporary cut of the discharge current changes depending on a maximum value (ISPPKL) of the minimum discharge current (ISPMN) and a discharge period (TSP)
Figure 7B:
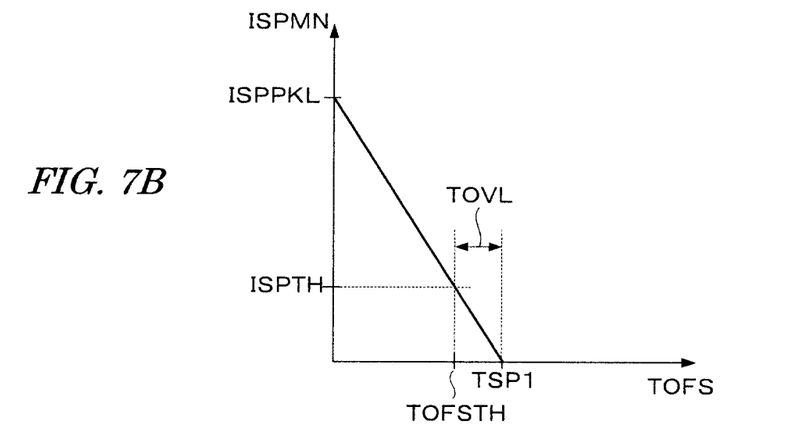

FIGS. 7A and 7B are drawings for explaining that the temporary cut preventing offset time period TOFSTH changes depending on the minimum peak value ISPPKL and the discharge period TSP1. The minimum peak value ISPPKL is the maximum value of the minimum discharge current ISPMN, i.e., the discharge current value at the start of discharge caused by the secondary voltage of the first coil pair 11. The minimum peak value ISPPKL and the discharge period TSP1 are parameters which are determined by the specification of the coil pairs 11 and 12.

FIG. 7A shows a relationship corresponding to a case where the minimum peak value ISPPKL takes a comparatively small value of about 50 mA, and the discharge period TSP1 is comparatively short. In this case, the temporary cut preventing offset time period TOFSTH is relatively short with respect to the discharge period TSP1 and the overlap discharge period TOVL is relatively long with respect to the discharge period TSP1 (corresponding to a value of about 60% of the discharge period TSP1), since the temporary cut threshold value ISPTH does not change.

FIG. 7B shows a relationship corresponding to a case where the minimum peak value ISPPKL takes a comparatively large value of about 100 mA, and the discharge period TSP1 is comparatively long. In this case, the temporary cut preventing offset time period TOFSTH is relatively long with respect to the discharge period TSP1 and the overlap discharge period TOVL is relatively short with respect to the discharge period TSP1 (corresponding to a value of about 30% of the discharge period TSP1).

FIG. 7A corresponds the case where a ratio RTOVL of the overlap discharge period TOVL to the discharge period TSP1 is substantially the maximum, and FIG. 7B corresponds to the case where the overlap period ratio RTOVL is substantially the minimum. That is, the overlap period ratio RTOVL corresponding to other combinations of the minimum peak value ISPPKL and the discharge period TSP1 takes a value between 30% and 60%.

As described above in this embodiment, the first and second ignition signals S11 and S12 are generated so as to satisfy the following conditions:

1) the first discharge period TSP1 from start to end of the discharge generated by the electric current supplied to the first primary coil 11a, and the second discharge period TSP2 from start to end of the electric discharge generated by the electric current supplied to the second primary coil 12a, partially overlap with each other;

2) the start timing (t2) of the first discharge period TSP1 is prior to the start timing (t3) of the second discharge period TSP2; and 3) the overlap discharge period TOVL coincides with the set overlap period TOVLSET which is set according to the first discharge period TSP1, the temporary cut threshold value ISPTH, and the minimum peak value ISPPKL which is a discharge current value at the start timing of the first discharge period TSP1.

Specifically, the target period TTGT is calculated by applying the first discharge period TSP1, the temporary cut threshold value ISPTH, and the minimum peak value ISPPKL to the equation (1), and the set overlap period TOVLSET is set to a value which is in the vicinity of the target period TTGT and is equal to or greater than the target period TTGT. Accordingly, it is possible to perform the ignition of the overlap ignition mode in which the peak discharge current ISPPK is reduced to the minimum within the range where no temporary cut of the discharge current occurs. In other words, the overlap ignition (multiple ignition) can be performed with the optimum setting for suppressing wear of the ignition plug 1.

In this embodiment, the ECU 3 constitutes the control means.

The present invention is not limited to the embodiment described above, and various modifications may be made. For example, in the above-described embodiment, the temporary cut threshold value ISPTH is previously set so that the temporary cut of the discharge current may not occur in the severest engine operating condition, i.e., the high rotational speed and high load operating condition. The temporary cut threshold value ISPTH may be set according to one or more parameters indicative of the air-fuel mixture flow (gas flow) in the combustion chamber, such as the engine rotational speed NE and the intake air flow rate GA, which are detected during engine operation. In such case, the temporary cut threshold value ISPTH is set so as to increase as the engine rotational speed NE increases, and set so as to increase as the intake air flow rate GA increases.

According to this modification, the temporary cut threshold value ISPTH can be set to a smaller value compared with the above-described embodiment in a low rotational speed condition or a low load operating condition, which makes it possible to reduce the peak discharge current ISPPK. Consequently, wear of the ignition plug 1 can more greatly be suppressed.

In this modification, the ECU 3 constitutes the temporary cut threshold value calculating means.

Figure 8:
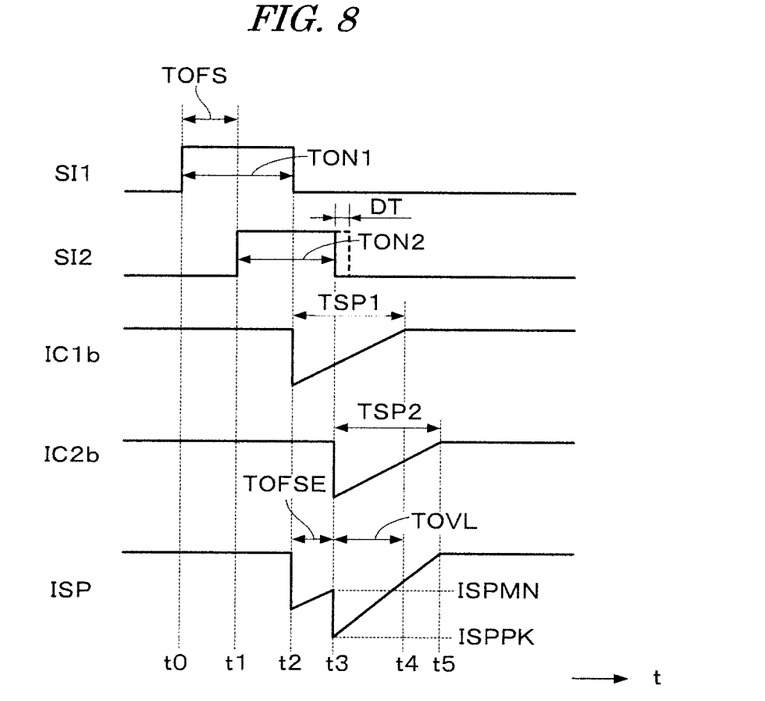
FIG. 8 shows time charts for explaining a case where the current supply periods (TON1, TON2) of the two ignition signals (SI1, SI2) in the overlap ignition mode are different from each other.

Further, in the above-described embodiment, the second current supply period TON2 is made equal to the first current supply period TON1. The present invention can be applied when the second current supply period TON2 is set to a period different from the first current supply period TON1. For example, as shown in FIG. 8, if the second current supply period TON2 is set to a period shorter than the first current supply period TON1 by a difference DT, a relationship between the offset time period TOFS and an end offset time period TOFSE is given by the following formula (3), wherein the offset time period TOFS is a time difference in the start timing of the current supply period, and the end offset time period TOFSE is a time difference in the end timing of the current supply period.

$$TOFS = TOFSE + DT \quad (3)$$

Further, desirable setting of the end offset time period TOFSE is given by the following equation (2a). Accordingly, the offset time period TOFS is given by the following equation (4).

$$TOFSE = TSP1 - TOVLSET \quad (2a)$$

$$TOFS = TSP1 - TOVLSET + DT \quad (4)$$

What is claimed is:

1. An ignition apparatus for an internal combustion engine, comprising at least one ignition plug, an actuating circuit provided with first and second coil pairs corresponding to one ignition plug for generating spark discharge in said at least one ignition plug, and control means for generating first and second ignition signals supplied respectively to said first and second coil pairs, said ignition apparatus being characterized in that, said control means generates the first and second ignition signals so that a first discharge period and a second discharge period partially overlap with each other during an overlap discharge period, the overlap discharge period is made equal to a set overlap period, and a start timing of the first discharge period is prior to a start timing of the second discharge period, wherein the first discharge period is a time period from start to end of an electric discharge generated by electric current supplied to a first primary coil constituting said first coil pair, and the second discharge period is a time period from start to end of an electric discharge generated by electric current supplied to a second primary coil constituting said second coil pair, wherein the set overlap period is set according to the first discharge period, a temporary cut threshold value, and a discharge start current value which is a discharge current value at the start timing of the first discharge period, the temporary cut threshold value being a minimum value of the discharge current value at which no temporary cut of the discharge current in said ignition plug occurs.

2. The ignition apparatus according to claim 1, wherein said control means starts to supply current to said second primary coil when an offset time period has elapsed from the time of starting to supply current to said first primary coil, a current supply period of said first primary coil being equal to a current supply period of said second primary coil, and the offset time period is a time period obtained by subtracting the set overlap period from the first discharge period.

3. The ignition apparatus according to claim 1, wherein the set overlap period is set to a time period which is in the vicinity of a target period calculated with the following equation, and is equal to or longer than the target period:

$$TTGT = TSP1 \times ISPTH / ISPPKL$$

where TTGT is the target period, TSP1 is the first discharge period, ISPTH is the temporary cut threshold value, and ISPPKL is the discharge start current value.

4. The ignition apparatus according to claim 2, wherein the set overlap period is set to a time period which is in the vicinity of a target period calculated with the following equation, and is equal to or longer than the target period;

$$TTGT = TSP1 \times ISPTH / ISPPKL$$

where TTGT is the target period, TSP1 is the first discharge period, ISPTH is the temporary cut threshold value, and ISPPKL is the discharge start current value.

5. The ignition apparatus according to claim 1, wherein said control means includes temporary cut threshold value calculating means for calculating the temporary cut threshold value according to at least one engine operating parameter correlated with gas flow generated in a combustion chamber of said engine, and said control means sets the set overlap period using the temporary cut threshold value calculated by said temporary cut threshold value calculating means.

6. The ignition apparatus according to claim 2, wherein said control means includes temporary cut threshold value calculating means for calculating the temporary cut threshold value according to at least one engine operating parameter correlated with gas flow generated in a combustion chamber of said engine, and said control means sets the set overlap period using the temporary cut threshold value calculated by said temporary cut threshold value calculating means.

7. The ignition apparatus according to claim 3, wherein said control means includes temporary cut threshold value calculating means for calculating the temporary cut threshold value according to at least one engine operating parameter correlated with gas flow generated in a combustion chamber of said engine, and said control means sets the set overlap period using the temporary cut threshold value calculated by said temporary cut threshold value calculating means.

8. The ignition apparatus according to claim 4, wherein said control means includes temporary cut threshold value calculating means for calculating the temporary cut threshold value according to at least one engine operating parameter correlated with gas flow generated in a combustion chamber of said engine, and said control means sets the set overlap period using the temporary cut threshold value calculated by said temporary cut threshold value calculating means.

* * * * *